Patented Dec. 30, 1930

1,787,416

UNITED STATES PATENT OFFICE

ALFRED WOHL, OF DANZIG-LANGFUHR, FREE CITY OF DANZIG, ASSIGNOR TO I. G. FARBENINDUSTRIE AKTIENGESELLSCHAFT, OF FRANKFORT-ON-THE-MAIN, GERMANY, A CORPORATION OF GERMANY

CATALYTIC OXIDATION OF ORGANIC COMPOUNDS

No Drawing. Application filed August 11, 1921, Serial No. 491,530, and in Germany June 22, 1916.

(GRANTED UNDER THE PROVISIONS OF THE ACT OF MARCH 3, 1921; 41 STAT. L., 1313)

I have found that the oxidation of hydrocarbons by means of free oxygen can be carried out with the production of valuable intermediary products if temperatures below red heat are employed and if catalysts are used that have no tendency for accumulating heat and splitting off hydrogen, as platinum metals commonly do, but which simply act as oxidizing agents owing to their containing oxygen in a loosely combined state. The catalysts must be non-volatile and capable of being regenerated under similar conditions of temperature by the introduced oxygen, and neither their higher nor their lower combinations with oxygen must be considerably vaporized at the said temperatures.

Vanadic oxides have proved very suitable for carrying out the reaction. They can be replaced by other similarly acting catalysts, or mixtures with same. As instances of such catalysts may be mentioned molybdic oxide, uranic acid in the form of the yellow potassium uranate, and chromic acid as bichromate. In other words, such metallic oxygen compounds are suitable which below red heat are converted into anhydrous acids or oxides of a non-basic nature, so that carbonyl compounds or acids are not absorbed which would lead to a farther going combustion. The catalyst should be uniformly distributed on a suitable bed or support, for instance, pumice stone in as thin a layer as possible. With this object in view vanadic oxide is precipitated, for instance, from its colloidal solution by animal charcoal, or bichromate is finely powdered and either of the two compounds is shaken for some time with small pieces of pumice stone which has been previously soaked with gum solution and dried. The shaking is continued until the catalyst is uniformly distributed over the surface of the pumice stone or the like. In each particular case the most favorable conditions as to temperature, speed of air for a definite active layer, degree of moisture and percentage of oxygen in the gas to be used, concentration of the substance to be oxidized &c. must be ascertained. I can carry out my process at an ordinary or at a high or reduced pressure and the oxidation by means of the catalyst and its regeneration may be performed alternately.

While the temperature should be below red heat, that is below about 580 degrees centigrade, in most cases much lower temperatures will be sufficient.

If heated atmospheric air of about 200 degrees centigrade be passed over fused anthracene and subsequently over the catalyst described at a temperature of about 250 degrees centigrade, the vapors of the anthracene going over will already contain some anthraquinone. If the catalyst be heated to about 400 degrees centigrade, pure anthraquinone is obtained, but the formation of carbon dioxid is increased. The same product is obtained by using triphenylmethane, whereas toluene yields benzaldehyde and benzoic acid. Tar fractions containing aromatic hydrocarbons with side-chains yield mixtures of aldehydes and acids, whilst high molecular unsaturated hydrocarbons contained, for instance, in brown coal tar are converted into acids by this oxidation.

I have further found that instead of using as catalysts the oxides of non-basic character, such as oxides of vanadium or molybdenum and the like, I can profitably use the metal salts of acids derived from said elements, as silver vanadate, copper vanadate and so on, for example, salts of heavy metals with such acids, the elements of which form more than one degree of oxidation. By the application of such metal salts the temperature of reaction is greatly decreased. Apart from the temperature, the efficiency of the catalyst depends essentially upon the pressure of oxygen that controls the speed of the regeneration of the catalyst surface. It is obvious that low temperatures of reaction are favorable for the production of valuable products of oxidation.

As such salts which may be used as catalysts are to be mentioned: vanadates, chromates, molybdates, uranates, stannates, arsenates and the like of metals, such as copper, silver, lead, thallium, platinum, cerium, nickel, cobalt, &c.

I have also found that the temperature of reaction is hereby decreased so far that I can carry out the process not only by passing the vapors of the substance to be oxidized together with air or oxygen over the catalyst suitably distributed, but I can also treat the substance to be oxidized either in a liquid state or dissolved in a neutral solvent by heating it with the catalyst in the presence of oxygen or atmospheric air preferably under increased pressure and agitation.

For example, sodium orthovanadate (prepared from 100 grams of vanadic oxide) is precipitated with the equivalent amount of silver nitrate (560 grams). The precipitate after being washed and filtered is distributed, by strong shaking, onto 4 kilograms of granulated pumice stone which has previously been soaked with 2 litres of a 5 per cent gum solution and then dried. After heating for 4 hours at 300 degrees centigrade in a current of air, the catalyst is ready for use. In a current of oxygen, by which the catalyst is always regenerated, at a temperature of 280 degrees centigrade nearly pure anthraquinone is obtained from anthracene without loss by combustion, if the current of oxygen is sufficiently quick and the concentration of the anthracene correspondingly low.

Another very active catalyst can be obtained according to the following method:—

One molecular proportion of vanadic oxide ($V_2O_5$) is dissolved by means of 6 molecular proportions of caustic alkali and precipitated with a solution of 3 molecular proportions of copper sulfate. The greenish yellow precipitate, after being washed and sucked off, is then suitably distributed onto pumice stone (about 50 times the quantity of the vanadic oxide used) which has beforehand been soaked with gum solution by strongly shaking, and moderately heated in a current of oxygen until the organic substance has disappeared. The catalyst thus prepared converts at 180–190 degrees centigrade anthracene into anthraquinone without any loss. The regeneration of the catalyst is, however, rather slow under these circumstances and increases with the temperature and the oxygen pressure. It is therefore increased, when the oxygen is passed in a cycle under increased pressure and while replacing the oxygen consumed, so that the places where the anthraquinone is vaporized, the catalyst's space and the place where the anthraquinone is deposited, are passed in regular turn.

By the term "non-volatile" in the appended claims is meant non-volatile under the conditions of working.

I claim:—

1. The process of catalytic oxidation of hydrocarbons to form carbonyl compounds, which comprises causing the vaporized hydrocarbons together with a gas containing free oxygen to pass at a temperature below red heat over a non-volatile catalyst of a non-basic character, which catalyst has the property of being regularly regenerated by free oxygen at said temperature.

2. The process of manufacturing carbonyl compounds from hydrocarbons which comprises passing the vaporized hydro-carbons together with an oxygen containing gas over a catalyst containing vanadium at a temperature below red heat.

3. The process of manufacturing carbonyl compounds from hydrocarbons which comprises passing the vaporized hydro-carbons together with an oxygen containing gas over a catalyst containing vanadium and another heavy metal.

4. The process of manufacturing carbonyl compounds from hydrocarbons which comprises passing a vaporized hydrocarbon together with an oxygen containing gas over a catalyst containing vanadium and silver.

5. The process of manufacturing anthraquinone by catalytically oxidizing anthracene which comprises passing an oxygen containing gas containing anthracene vapor over a catalyst containing vanadium at a temperature of about 400 degrees centigrade.

6. The process of manufacturing anthraquinone by catalytically oxidizing anthracene which comprises passing an oxygen containing gas containing anthracene vapor over a catalyst containing silver vanadate at a temperature of about 400 degrees centigrade.

In testimony whereof I have hereunto set my hand.

ALFRED WOHL.